Patented May 31, 1938

2,119,466

UNITED STATES PATENT OFFICE 2,119,466

PROCESS FOR THE MANUFACTURE OF UREA AND FORMALDEHYDE VARNISHES AND PRODUCT OBTAINED

Paul Michaut, Paris, France

No Drawing. Application May 1, 1936, Serial No. 77,455. In France September 25, 1935

3 Claims. (Cl. 134—26)

This invention relates to a process for the manufacture of a product obtained by the combination of urea or its derivatives with formaldehyde, which product is adapted to replace nitrocellulose or acetocellulose varnishes in their common applications by means of a brush or pistol.

The industrial product constituted by the varnish thus obtained has the following advantages over so-called "cellulose" varnishes:

(1) More rapid hardening;
(2) Absolute innocuousness;
(3) Uninflammability;
(4) Perfect vitrification of the surface treated;
(5) Very low cost price.

The process forming the subject-matter of the invention is characterized by the following features, taken separately or in combination:

(a) Formaldehyde found on the market (at 30 or 40% by volume) is neutralized beyond pH 3 (hydrogen index) by the addition of a sufficient quantity of a base or of an ammonia salt adapted to fix the free formic acid. This addition can be effected after the formation of the urea-formaldehyde mixture.

(b) To the urea-formaldehyde solution can be added a small quantity of primary, secondary, tertiary or polyvalent alcohols, so as to obtain a better condensation of the urea and formaldehyde by etherification of the alcohol in presence of free formic acid.

(c) Thus condensed at an average temperature (less than 80 degrees centigrade), the urea-formaldehyde combination tends to form a jelly in which the water "bound" forms a large proportion. This jellification rapidly increases if the whole is brought to boiling point, that is to say above the boiling point of formaldehyde. For remedying this inconvenience, at the beginning of the reaction, or in the course of the latter, to the urea-formaldehyde mixture can be added metallic bodies (oxides, hydroxides or pulverulent and anhydrous metals) the chemical activity of which is null, but which are adapted to destroy the colloidal micellae tending towards a too high concentration. For that purpose, use is made, in accordance with the invention, of silica, or dry alumina, or zinc more or less oxidized or hydrated.

(d) When the colloidal solution thus obtained is entirely freed of its water and eventually of its alcohol, it will have an entirely viscous aspect and its surface will give by oxidation a product very difficultly soluble in any solvent whatever. The concentration of this solution will be too high. For remedying this inconvenience, to said solution is added a small quantity of acetanilide dissolved in water, so that it has a fluidity sufficiently great for ensuring a long preservation.

(e) It is preferable that the colloidal solution should have a water content of 5 to 10%, in order that its solubility in pure or methylated ethyl alcohol should be perfect. The white colour of the whole will then disappear upon evaporation of the solvent and the varnish will vitrify with the same transparency as a sheet of glass.

(f) This vitrification is not accompanied by a rapid hardening of the varnish. The molecular concentration is, in fact, insufficient, the varnish having a hydrogen index developing, according to the preparations, within the limits of changing of colour by means of methyl red, that is to say between 4.4 and 6.5.

For obtaining immediate hardening, to the alcohol solution of the varnish is added, according to the invention, an acid, preferably a mineral acid, and in small proportion relatively to the whole, so that the pH lowers to about 2.5–3.

A strong base such as potash can be used in order that jellification may take place in the same conditions with a pH approximating 7–8.

By way of example, the process can be carried out in the following manner:

About 2800 grams of formaldehyde found on the market are caused to react on 1000 grams of urea by neutralizing the free formic acid by a suitable quanity of an ammonium salt, such as a lactate, an acetate, a chloride or a carbonate, or by an amide or an amide derivative. The hydrogen concentration index is higher than 4. To the whole can be added more than 5% of alcohols.

Before boiling, silica or pulverized zinc or alumina hydrate is added to the solution in the proportion of ½%. After boiling for a few minutes under pressure or in a reflux cooler, the solution is separated, by decantation, under pressure or under vacuum, from the mineral bodies.

Dehydration under pressure or under vacuum gives a thick syrup, more soluble in pure or methylated ethyl alcohol if care has been taken to add to the mass a small quantity (about 20 grams) of acetanilide dissolved in water.

For using the varnish with a brush or with a pistol, to the final solution is added from 0.50 to 3% of a mineral acid, such as sulphuric acid, hydrochloric acid, nitric acid, etc., or an ammonium salt (such as ammonium sulphocyanate, or ammonium phosphate) which, by decomposition, will give the necessary hydrogen ions, or again ortho-meta- or pyro-phosphoric acid, or their ammonia derivatives.

This varnish, which can be coloured in all tints, vitrifies very rapidly and gives coatings having the aspect of lacquer, which are colourless or tinted, and have a perfect and smooth luster.

What I claim is:

1. A process for the manufacture of varnish having a urea-formaldehyde base, comprising admixing urea and formaldehyde, neutralizing the formaldehyde by addition of a substance capable of fixing any free formic acid present, and then adding successively a small quantity of alcohol in order to obtain a better condensation, and means which is chemically inert under condensation conditions but is mechanically adapted to prevent the colloidal micellae from attaining too high a concentration, boiling the mixture to effect condensation of the urea and formaldehyde, separating the condensed product from said inert means, and finally, before dehydrating the mixture, adding a small quantity of acetanilide dissolved in water in order to render the mixture fluid.

2. A process for the manufacture of varnish having a urea-formaldehyde base, comprising admixing urea and formaldehyde, neutralizing the formaldehyde by addition of an ammonium salt capable of fixing any free formic acid present, and then adding successively a small quantity of alcohol in order to obtain a better condensation, and means which is chemically inert under condensation conditions but is mechanically adapted to prevent the colloidal micellae from attaining too high a concentration, boiling the mixture to effect condensation of the urea and formaldehyde, separating the condensed product from said inert means, and finally, before dehydrating the mixture, adding a small quantity of acetanilide dissolved in water in order to render the mixture fluid.

3. A process for the manufacture of varnish having a urea-formaldehyde base, comprising admixing urea and formaldehyde, neutralizing the formaldehyde by addition of an ammonium salt capable of fixing any free formic acid present, and then adding successively a small quantity of alcohol in order to obtain a better condensation, and a substance of the group consisting of silica and alumina, boiling the mixture to effect condensation of the urea and formaldehyde, separating the condensed product from said substance, and finally, before hydrating the mixture, adding a small quantity of acetanilide dissolved in water in order to render the mixture fluid.

PAUL MICHAUT.